Oct. 24, 1950     J. D. MALLETT ET AL     2,526,678
ULTRA HIGH FREQUENCY COUPLING
Filed April 2, 1943     2 Sheets-Sheet 1
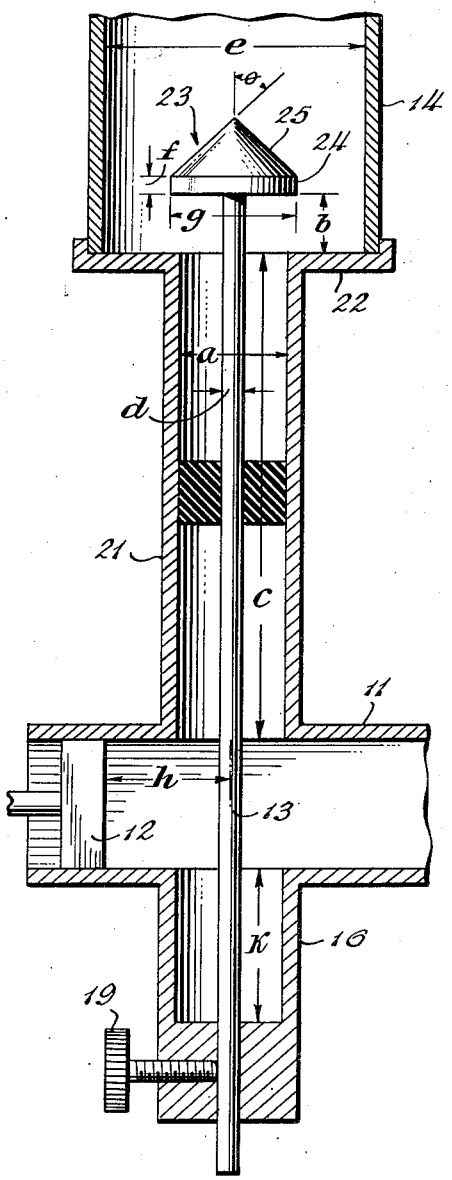
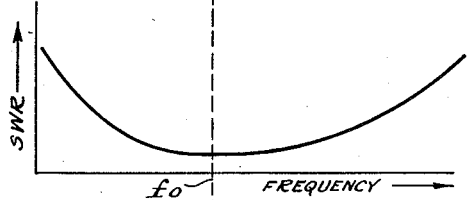
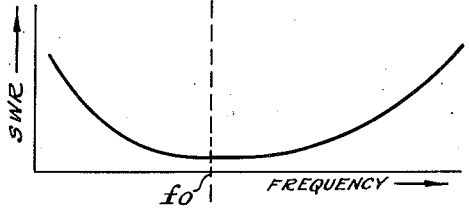
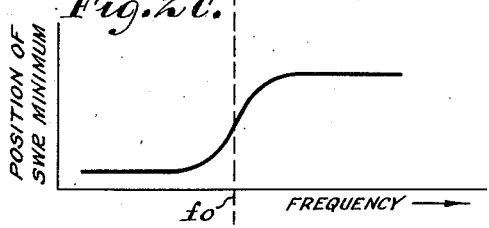
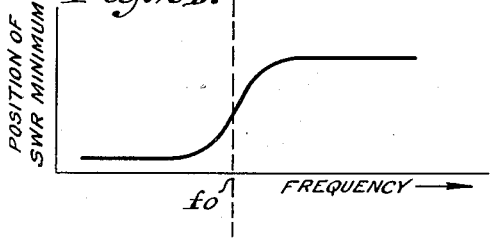
INVENTORS
JOHN D. MALLETT
JOSEPH H. GAMBLE
BY Paul B. Hunter
ATTORNEY INVENTORS
JOHN D. MALLETT
JOSEPH H. GAMBLE
BY Paul B. Hunter
ATTORNEY Patented Oct. 24, 1950

2,526,678

UNITED STATES PATENT OFFICE 2,526,678

ULTRA HIGH FREQUENCY COUPLING

John D. Mallett and Joseph H. Gamble, Garden City, N. Y., assignors to The Sperry Corporation, a corporation of Delaware Application April 2, 1943, Serial No. 481,640

13 Claims. (Cl. 178—44)

The present invention is concerned with apparatus for transmitting and exchanging ultra high frequency electromagnetic energy. In systems utilizing ultra high frequency electromagnetic energy in the microwave region, for example, having wave lengths shorter than 10 centimeters, it has become customary to utilize rectangular wave guides because of the ease with which sharp-angled bends can be made, and because of the simplicity of apparatus for coupling energy to such a wave guide, especially in the so-called "transverse electric" or TE mode, in which the electric field lines run in parallel fashion across the narrow cross-sectional dimension of the wave guide. Such a mode is easily excited and retains predetermined polarization throughout the length of the wave guide, so that energy couplings to such a wave guide can be simply provided.

In many applications, however, it is necessary to provide a movable or rotatable joint for the wave guide conducting the energy, as for example, where such energy is supplied to a radio scanner or other movable antenna. For such rotatable joints, it is desirable to use a circular cross-section wave guide excited in the "transverse magnetic" or TM mode, since, for this cross-section and mode of excitation, the construction of suitable rotatable joints is made relatively simple.

The combined use of such rectangular and circular wave guides requires a wave guide transformer or energy coupling device which will couple the TE mode energy in the rectangular wave guide to the TM mode energy in the circular wave guide. For best operation the following are the criteria to be satisfied:

A. A minimum of energy of the TE mode should be excited in the circular wave guide when energy is fed to the circular wave guide from the rectangular wave guide.

B. A perfect impedance match should be obtained.

C. A minimum change of impedance with frequency variation should be obtained.

D. Losses should be minimized.

E. A single adjustment should be sufficient to change the frequency range. (However, this is unnecessary if condition C is sufficiently well satisfied.)

F. The device should be easily constructed and have a minimum of critical dimensions.

According to the present invention, such an energy coupling device is provided which satisfactorily meets the conditions A through E, According to the present invention the rectangular and circular wave guides are coupled by a short section of concentric transmission line, the central conductor of this transmission line being extended into the rectangular wave guide to act as an energy coupling device or antenna with respect to energy in the rectangular wave guide, and also extending axially into the circular wave guide, where it is provided with a special termination to exchange energy with the circular wave guide. Further means are provided for matching the rectangular wave guide to its pick-up antenna and for matching the concentric line section to the circular wave guide.

Accordingly, it is an object of the present invention to provide an improved form of energy coupling efficiently operative at ultra high frequencies in the micro-wave region.

It is another object of the present invention to provide an improved ultra-high frequency energy coupling for transferring such energy between a rectangular wave guide and a circular wave guide.

It is still a further object of the present invention to provide an improved form of ultra-high frequency energy coupling device for coupling a concentric transmission line to a rectangular wave guide.

It is still a further object of the present invention to provide an improved ultra-high frequency energy coupling device for transferring ultra high frequency energy between a rectangular wave guide excited in the TE mode and a circular wave guide excited in the TM mode.

It is another object of the present invention to provide an improved rotatable joint between two wave guides or other high frequency energy conductors.

Other objects and advantages will become apparent from the following specification and drawings, in which—

Fig. 1 shows a longitudinal cross-sectional view of one form of the energy coupling device of the invention.

Figs. 2A to 2D are explanatory graphs useful in explaining the invention.

Figure 3:
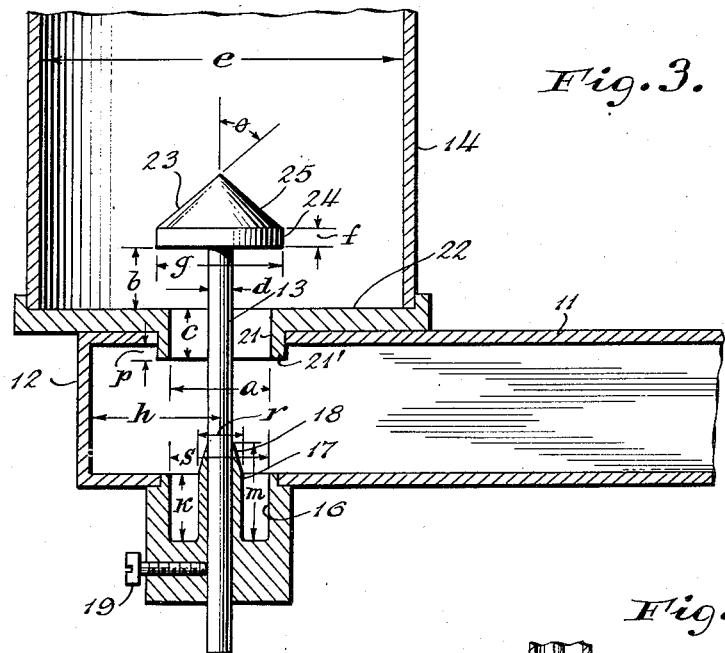
Fig. 3 is a longitudinal cross-sectional view of an improved form of the invention.

In the following analysis, involving Figs. 1–3, it will be assumed that energy is transferred from the rectangular to the circular wave guide. However, this assumption is made solely for purposes of simplicity and consistency of explanation, since the device of the present invention is perfectly bilateral in character and can equally well transfer energy from the circular wave guide to the rectangular wave guide.

Thus, referring to Fig. 1, let it be assumed that the rectangular wave guide 11 has energy entering from the right as seen in the figure, and is excited in the TE mode, with the electric field lines perpendicular to the longer side of the guide cross-section. The left end of wave guide 11 is closed by suitable wall 12 which may be made movable for impedance matching, as will appear. A rod 13 extends transversely of wave guide 11 and parallel to the direction of the electric field within the wave guide 11. It will be seen rod 13 acts as an antenna to pick up the energy flowing in the wave guide 11 and to transfer it to the circular wave guide 14. The distance $h$ is chosen or adjusted so that the electric field standing wave in the wave guide at the position of the rod 13 will have a maximum value. The lower end of rod 13 is connected to the lower wall of wave guide 11 by means of a short-circuited transmission line, which, in this case, is formed by an outer conductor 16 and an inner conductor which is an extension of rod 13. Preferably, rod 13 is made axially adjustable by means of a suitable set screw 19, for purposes which will later appear. The depth $k$ of this stub line may be made adjustable, and is adjusted or selected to produce a maximum energy transfer between the wave guide 11 and rod 13, and is slightly less than one-quarter wavelength (in free space) of the operating frequency.

The energy excited in rod 13 is transferred to the circular wave guide 14 through a concentric transmission line section whose inner conductor is formed by rod 13 or an extension thereof and whose outer conductor is formed by a tubular conductor 21 connected in or integral with the upper wall of wave guide 11. Conductor 21 is located coaxially with respect to wave guide 14 and is connected to or formed concentrically in an end plate 22 closing the lower end of wave guide 14.

Rod 13 extends into wave guide 14 coaxially thereof for an adjustable distance $b$ and carries at its upper end a terminating member 23 which has a cylindrical section 24 of diameter $g$ and length $f$, this cylindrical section 24 being also located concentrically of wave guide 14 and rod 13. To provide a fairly smooth transfer of energy between line 13, 21 and what is effectively a second coaxial line 24, 14, the ratio $e/g$ of the diameters of the conductors 14, 24 is made the same as the ratio $a/d$ of the diameters of conductors 21 and 13.

The termination 23 is also provided with a conical section 25 having a semi-apex angle $\theta$. This conical portion is made relatively short compared to a wavelength, a semi-apex angle of about 50° having been determined as optimum. The base of termination 23 is parallel to end plate 22 so that the electric field between these two surfaces is substantially perpendicular to the surfaces.

In this manner the standing waves produced by the junction between line 13, 21 and wave guide 14 are minimized over a broad band of frequencies and termination 23 serves as a low Q coupling device.

The proper choice of dimensions and the design of the device of Fig. 1 may be best understood by reference to Figs. 2A to 2D. If we assume, for the time being, that transmission line 13, 21 is perfectly terminated at its upper end, then any impedance mismatch between transmission line 13, 21 and the waveguide 11, due to the unavoidable abrupt changes in dimensions of the various parts of the device already described, will produce a reflected wave in wave guide 11 traveling oppositely to the incoming wave. As is well known, this will set up standing waves in the waveguide 11 whose maxima are spaced apart a distance equal to a half wavelength and whose minima are likewise spaced apart a distance equal to a half wavelength of the operating frequency, in the guide.

The assumption just made, that the transmission line 13, 21 is perfectly terminated at its upper end, is of course not strictly fulfilled in practice. Actually, because of the abrupt changes in the dimensions at the junction between waveguide 14 and line 13, 21, impedance mismatch and energy reflection will occur here also. Neglecting, for the moment, the reflections produced at the coupling between waveguide 11 and line 13, 21, it will be seen that the reflection due to the coupling between line 13, 21 and waveguide 14 will also produce standing waves in waveguide 11, whose maxima or minima are similarly spaced a half wavelength apart along the waveguide 11. The relative positions of the maxima of the first standing wave discussed above and of the second standing wave, depend primarily upon the length of the line 13, 21 and upon the design of the couplings between the line 13, 21 and the guides 11 and 14. By proper choice of the line and couplings, the reflected wave caused by the upper coupling between line 13, 21 and waveguide 14 may be made to have a phase difference of 180° with respect to the reflected wave produced by the lower coupling between line 13, 21 and waveguide 11, in which case the respective standing wave minima produced by the two reflected waves are displaced by a quarter wave length along the guide 11. Then if the proper amplitudes of reflected wave are obtained, the two reflected waves will cancel completely at every point along waveguide 11, with the net result that no standing waves will be set up in waveguide 11 and the system can be considered to be perfectly matched. By the well-known reciprocity theorem, of course, this means that the system will also be perfectly matched for energy flowing from waveguide 14 toward waveguide 11.

Accordingly, the length $c$ of transmission line 13, 21 and the dimensions of the couplings are chosen to provide this perfect impedance match, or as near to it as can be practically attained. The adjustment of termination 23 by means of set screw 19 permits the adjustment of the reflection produced by the upper coupling relative to that produced by the lower coupling to provide substantially perfect cancellation of the reflected waves, as is desired.

The above discussion has application where the system operates on a single, fixed frequency. However, it may be desirable to have the system operate satisfactorily for over a range of frequencies. This may also be done by the present system.

Referring to Figs. 2A to 2D, Fig. 2A shows approximately the variation of standing wave ratio (that is, the ratio of the standing wave maximum to the standing wave minimum) in the waveguide 11, with frequency, due only to the lower coupling between line 13, 21 and waveguide 11. Fig. 2B shows a similar curve for the upper coupling between waveguide 14 and line 13, 21. It will be seen from these curves that a characteristic of the present coupling is that the variation of standing wave ratio with frequency is relatively small, at least near an optimum frequency $f_0$.

As the applied frequency is varied, the positions of the standing wave maxima and minima in waveguide 11 will also change. The variation of the position of the standing wave minimum due to change in frequency is plotted in Figs. 2C and 2D for the lower and upper couplings respectively. By a proper choice of values $h$ and $k$ and of $f$ and $b$, these two characteristics may be made very similar, each having a maximum rate of variation of standing wave minimum position with respect to frequency at the same frequency $f_0$, and a minimum rate of change of standing wave ratio with frequency at the same frequency $f_0$. When these conditions obtain, the length $c$ of the line 13, 21 may be adjusted or selected to cause the respective standing wave minima or maxima due to reflection from the upper and lower couplings to move in the same sense and by substantially the same amount in waveguide 11 in response to a predetermined change in frequency. Therefore, if the system is practically perfectly matched in the above manner, at one frequency, such as $f_0$, it will remain substantially matched for differing frequencies in the neighborhood of $f_0$. Accordingly, the system can operate satisfactorily over a substantial range of operating frequencies, and is therefore designed to satisfactorily obtain a minimum change of impedance with frequency variation as required for practical use.

It is to be noted that a further improvement in operating frequency range can be obtained by resetting the position of termination 23 for differing frequencies. The distance $h$ need not be changed after having once been selected and therefore the wall 12 may be fixed if desired.

Fig. 3 shows an improved form of the present device. For compactness and greater practicability, it is desirable to have the coupling between waveguides 11 and 14 as short as possible. As is well known, the effect of a transmission line is substantially unchanged by an increase or decrease in its length by a half-wavelength of the operating frequency or a multiple thereof. Accordingly, transmission line 13, 21 in Fig. 3 has been made substantially the same as the value determined in the device of Fig. 1, but cut down by an integral number of half-wavelengths of an operating frequency in the middle of the range over which the device is to be used.

By making this transmission line as short as possible, the frequency characteristics of the device are further improved, since the cumulative effect of the extended length of the transmission line of Fig. 1 on the shift of the standing wave minimum, when the system is operating at a frequency differing from $f_0$, is greatly reduced, producing an even broader standing wave ratio versus frequency characteristic and a better minimum position versus frequency characteristic than those shown in Figs. 2A–2D.

In order to further improve the characteristic of Figs. 2A and 2C and match them more closely to the remaining characteristics, the transmission line 13, 21 has been extended into the waveguide 11 for a short distance $p$. It has been found that the extension 21' of outer conductor 21 within the waveguide 11 by the proper distance $p$ modifies the frequency characteristics of the device to produce the desired operation described above.

Also, to improve these characteristics still more, the stub transmission line formed by antenna 13 and conductor 16 has been modified by providing an inner conductor 17 surrounding antenna 13 for a distance $m$ and provided with a tapered transition section 18 joining conductor 17 to the antenna 13. The stub line 16, 17 is preferably made unitary, by machining or joining. By making the distance $m$ substantially equal to a quarter-wavelength of the operating frequency, losses at the sliding joint between antenna 13 and the remainder of the apparatus are substantially reduced, since the joint is thereby located at a current minimum of the standing waves produced on the antenna 13. In this manner, the operation of the device is greatly improved over that shown in Fig. 1, the impedance match being improved and the usable frequency range being extended.

A suitable illustrative set of values of the various dimensions of the device of Fig. 3 have been found to be as follows, when operating at a wavelength in the neighborhood of 3.2 centimeters, and when coupling the lowest or $TE_{1,0}$ mode in a 0.9 by 0.4 inch (internal dimensions) rectangular guide to the lowest TM mode in the circular wave guide:

$a = .375$ inch
$b = .192$ inch
$c = .215$ inch
$d = .156$ inch
$e = 1.17$ inches
$f = .065$ inch
$g = .500$ inch
$h = .315$ inch
$k = .275$ inch
$m = \frac{5}{16}$ inch
$p = .072$ inch
$r = .187$ inch
$s = .375$ inch
$\theta = 50°$ These values are, of course, merely illustrative of one form of the invention, and may be varied widely within the limits of the discussion above.

It is to be understood that the device of the present invention, instead of being utilized solely for transferring energy between waveguides 11 and 14, could be utilized for transferring ultra high frequency between waveguide 11 and a concentric transmission line 13, 21 connected to any desired apparatus, by replacing the waveguide 14 and its coupling by such apparatus. Also, the invention could be utilized as a coupling between waveguide 14 and such utilization apparatus, by replacing waveguide 11 and its coupling by this apparatus.

Figure 4:
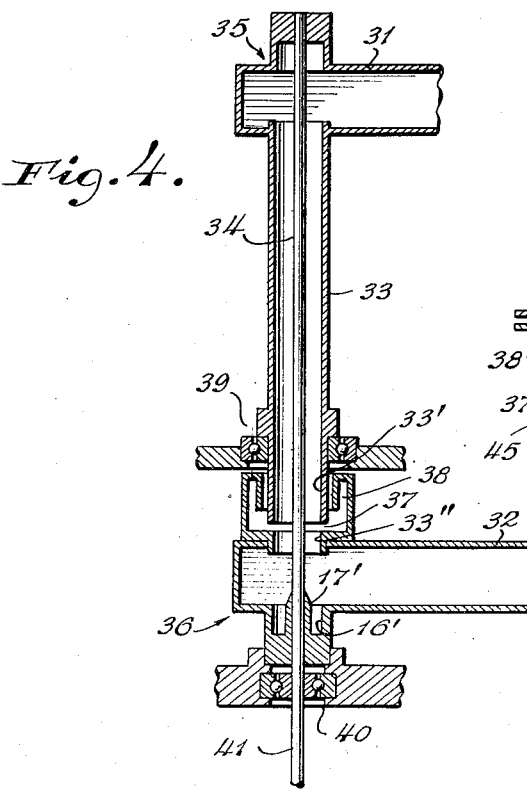
Fig. 4 shows a similar longitudinal cross-sectional view of an adaptation of the present invention to a rotatable coupling or joint between two wave guides.

Fig. 4 shows an adaptation of a portion of the device of Figs. 1 and 2 for use in a rotatable waveguide coupling or joint. In some waveguide applications it is desirable to permit two waveguides to move in parallel planes and to rotate about an axis perpendicular to this plane. This may be accomplished by the device shown in Fig. 4.

Thus, Fig. 4 shows a pair of waveguides 31 and 32, illustrated as being of rectangular cross-section. Providing a coupling between waveguides 31 and 32 is a concentric line having an outer conductor 33 and an inner conductor 34. Concentric line 33, 34 is coupled to waveguide 31 by the use of the coupling 35 shown in the lower part of Fig. 1, which need not be described in detail here. It will be noted, however, that the outer conductor 33 has been extended within the waveguide 31 in a manner analogous to that described with respect to sleeve 21' in Fig. 3, and serves to broaden the frequency characteristics of the coupling 35. Waveguide 32 is coupled to concentric line 33, 34 by means of a coupling 36 similar to that shown in Fig. 3.

In order to permit relative rotation between waveguides 31 and 32 about the axis of line 33, 34, the outer conductor 33 is split into two parts 33', 33'' by a gap 37, which may be placed anywhere along the length of the outer conductor 33 as is desired or required by the particular nature of the device. A wave trap 38, of the type disclosed more fully in copending application Serial No. 447,524, filed June 16, 1942, now Patent No. 2,407,318, issued September 10, 1946 in the names of Walter W. Mieher and John D. Mallett, the latter inventor also being one of the present joint inventors, is located at gap 37. This wave trap 38 operates to produce a very low series impedance at the gap 37, so as to give minimum hindrance to the flow of energy across the gap and to prevent high frequency energy from leaking outward of the device through the gap.

Central conductor 34 is fastened rigidly to the waveguide 31 by means of the coupling 35 and extends through the inner conductor 17' of the stub line 17', 15' forming part of coupling 36. Set screw 19 of Fig. 3 is omitted in Fig. 4, and inner conductor 34 is freely rotatable within the conductor 17'. In this way, waveguide 31 and line 33, 34 may be rotated relative to waveguide 32, suitable bearings 39 and 40 being provided. If desired, central conductor 34 may be supplied with an extension 41 to which the driving or motive power or adjustment control for the rotation of the two waveguides may be fastened.

Figure 5:
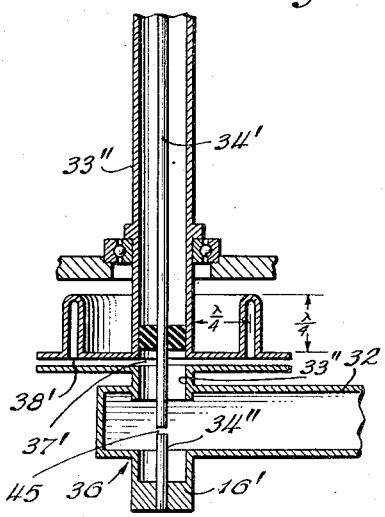
Fig. 5 shows a modification of a portion of Fig. 4.

Fig. 5 shows a modification of the lower portion of Fig. 4. In this case, the inner conductor 34 is split into two portions 34' and 34''. Portion 34' is fixed to outer conductor section 33', waveguide 31 and coupling 35, while portion 34'' is fixed with respect to the waveguide 32 by being rigidly connected to the outer conductor 16' of the matching stub line of coupling 36. The gap 45 between sections 34', 34'' is made as small as is practicable, and is located at substantially a quarter-wavelength, or an odd multiple thereof, from the connection between conductor 34'' and the remainder of the coupling stub line 36. In this way this gap occurs at a current node of any standing wave produced on line 33—34, and will have minimum effect upon the operation of the system. Fig. 5 also illustrates a modified form of wave trap 38' at gap 37' which operates in the same manner as wave trap 38 of Fig. 4 to produce a low series impedance at gap 37'.

It will be seen that by the proper choice of the length of the line 33—34 in Figs. 4 and 5 and the proper design of the couplings 36 and 35 in the manner described with respect to Figs. 1 to 3, the overall frequency characteristics of the devices of Figs. 4 and 5 may be materially improved over the corresponding characteristics of either of the couplings 35 or 36 individually, and a resultant highly efficient rotatable joint and coupling is produced.

It will be noted that a similar rotating coupling may be produced utilizing two of the couplings shown in Figs. 3 or 1, to couple respective rectangular waveguides such as 31 or 32 into a single circular waveguide, corresponding to waveguide 14. By supplying a suitable rotatable joint in waveguide 14 of any of the types shown in the above-mentioned application Serial No. 447,524, an efficient and useful rotatable waveguide joint of the type shown in Figs. 4 and 5 may be produced. Also, the devices of Figs. 4 and 5 may equally well be utilized for rotatably coupling a concentric transmission line, such as 33, 34, with a waveguide.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Ultra high frequency apparatus for interchanging energy between a rectangular wave guide and a circular wave guide, comprising an antenna member disposed in said rectangular wave guide parallel to the electric field therein, and connected with one wall of said wave guide by a short-circuited stub concentric transmission line, said antenna member extending through the opposite wall of said rectangular wave guide and terminating in a tip member having an enlarged diameter cylindrical section and also having a tapered section shorter than a wavelength of the operating frequency, a sleeve surrounding the portion of said antenna member passing through said opposite wall and forming a concentric transmission line coupling therewith, the circular wave guide surrounding said antenna member and being disposed coaxially of said antenna member and sleeve, whereby ultra high frequency energy may be exchanged between said rectangular wave guide and said circular wave guide.

2. Ultra high frequency apparatus as in claim 1, further including means for adjusting the position of said tip member relative to said circular wave guide and sleeve for providing proper impedance matching between said wave guides.

3. Ultra high frequency apparatus as in claim 1, wherein said concentric line coupling has a length such that the reflected wave produced by the coupling between said antenna member and said rectangular wave guide is in phase opposition to the reflected wave produced by the coupling between said antenna and said circular wave guide.

4. Ultra high frequency apparatus for interchanging energy between a rectangular wave guide and a circular wave guide comprising an elongated antenna member disposed across said rectangular wave guide parallel to the electric field therein, means for coupling said antenna member to said rectangular wave guide comprising a short-circuited stub concentric transmission line section having an outer member connected to a wall of said rectangular wave guide and an inner member surrounding and contacting said antenna member for a distance substantially a quarter-wavelength from the short-circuited end of said stub line, means comprising a conducting sleeve passing through an opposite wall of said rectangular wave guide forming a coupling concentric transmission line section with said antenna member, and means for coupling said concentric transmission line section to said circular wave guide, comprising a terminating member connected to the end of said antenna member and coaxially within said circular wave guide, said terminating member having a cylindrical section having a diameter related to the inner diameter of said circular wave guide in the same proportion as the ratio of the diameter of said antenna member to that of said sleeve, and also having a conical tip shorter than a wavelength of the operating frequency.

5. Ultra-high-frequency apparatus for interchanging energy between a rectangular wave guide and a rod-like antenna member extending substantially parallel to the electric field of said wave guide and through apertures in opposite walls of said wave guide, comprising a short-circuited stub concentric transmission line having an outer conductor positioned in one of said apertures and connected to the wall of said wave guide, and an inner conductor snugly fitted around said antenna member, said inner conductor having a length from the short-circuited end of said stub line of substantially a quarter-wavelength of the operating frequency, and a conducting sleeve in the other of said apertures and extending slightly within said wave guide, and forming a concentric transmission line section with said antenna member.

6. Ultra high frequency apparatus for interchanging energy between two wave guides having mutually perpendicular axes and adapted to maintain different modes of energy propagation therein, comprising a coupling concentric transmission line extending between said wave guides and having an inner conductor, of which one end extends through concentric openings in the side wall of a first one of said wave guides, and means at the other end of said inner conductor for coupling the second one of said wave guides to said line, said line having a length such that the reflected wave produced by one of said couplings is in phase opposition to that produced by the other of said couplings.

7. Ultra high frequency apparatus as in claim 6, further including means adjacent one end of said inner conductor for independently adjusting the degree of insertion of the other end of said inner conductor for making the amplitude of one of said reflected waves to be substantially equal to the other, whereby substantially no standing waves are formed in said wave guides.

8. An ultra high frequency apparatus as in claim 6, wherein said other end of the inner conductor of said concentric transmission line extends within said second guide for a predetermined distance to form said coupling means, whereby said apparatus may be utilized effectively over a wide band of frequencies.

9. A rotatable coupling between a concentric transmission line and a wave guide, comprising a pair of sleeves mounted in apertures in opposite sides of said guide and coaxial with said line, the inner conductor of said line being extending coaxially through said sleeves and across said guide, a further sleeve extending into said wave guide and slidably surrounding said inner conductor and concentric with one of said first sleeves to form a concentric transmission line section therewith, said further sleeve being slightly longer than said one of the first sleeves, and means for short-circuiting said further sleeve to said one sleeve to form a short-circuited stub line, whereby said first concentric transmission line with its inner conductor may be rotated relative to said sleeves and wave guide without affecting the electrical characteristics of the device.

10. A coupling as in claim 9, wherein said further sleeve is substantially a quarter-wavelength long at the operating frequency, whereby the sliding joint between said inner conductor and further sleeve is located at a current node.

11. A coupling as in claim 9, further including means at the gap between the outer conductor of said line and the other of said sleeves for preventing hindrance to the flow of ultra high frequency energy across said gap.

12. Ultra-high-frequency apparatus for interchanging energy between a rectangular wave guide and a rod-like antenna member extending substantially parallel to the electric field of said wave guide and through apertures in opposite walls of said wave guide, comprising a short-circuited stub concentric transmission line having an outer conductor positioned in one of said apertures and connected to the wall of said wave guide and an inner conductor snugly fitted around said antenna member, said inner conductor having a length from the short-circuited end of said stub line of substantially a quarter-wavelength of the operating frequency, said inner conductor being formed with a transition section of varying external diameter for providing improved impedance match.

13. Ultra high frequency apparatus as in claim 6 wherein said coupling means comprises a terminating member projecting within said second wave guide and having a cylindrical section of a diameter substantially greater than the diameter of said inner conductor and a conical section shorter than a wavelength of the operating frequency.

JOHN D. MALLETT.
JOSEPH H. GAMBLE.

REFERENCES CITED

The following references are of record in the file of this patent:

UNITED STATES PATENTS

| Number | Name | Date |
| --- | --- | --- |
| 2,129,712 | Southworth | Sept. 13, 1938 |
| 2,147,717 | Schelkunoff | Feb. 21, 1939 |
| 2,206,923 | Southworth | July 9, 1940 |
| 2,207,845 | Wolff | July 16, 1940 |
| 2,226,479 | Pupp | Dec. 24, 1940 |
| 2,232,179 | King | Feb. 18, 1941 |
| 2,241,616 | Roosenstein | May 13, 1941 |
| 2,342,254 | Dallenbach | Feb. 22, 1944 |
| 2,407,318 | Mieher et al. | Sept. 10, 1946 |
| 2,408,032 | Beck | Sept. 24, 1946 |
| 2,434,925 | Haxby | Jan. 27, 1948 |

FOREIGN PATENTS

| Number | Country | Date |
| --- | --- | --- |
| 116,110 | Australia | Nov. 4, 1942 |